USOO5711072A

United States Patent [19]
Nakamura

[11] Patent Number: 5,711,072
[45] Date of Patent: Jan. 27, 1998

[54] METHOD FOR FABRICATING ELASTOMER COATED FIXING ROLLS

[75] Inventor: Akito Nakamura, Chiba Prefecture, Japan

[73] Assignee: Dow Corning Toray Silicone Co., Ltd., Tokyo, Japan

[21] Appl. No.: 495,013

[22] Filed: Jun. 27, 1995

[30] Foreign Application Priority Data

Jun. 30, 1994 [JP] Japan ................... 6-173615

[51] Int. Cl.[6] ................... B23P 15/00
[52] U.S. Cl. ................... 29/895.32; 29/895.21; 29/895; 492/56
[58] Field of Search ................... 29/895.32, 895, 29/895.21; 492/56; 264/135

[56] References Cited

U.S. PATENT DOCUMENTS

| 5,089,201 | 2/1992 | Takahashi | 29/895.32 |
| 5,114,521 | 5/1992 | Isegawa et al. | 29/895.32 |
| 5,177,322 | 1/1993 | Nishimura et al. | 29/895.32 |
| 5,206,992 | 5/1993 | Carlson et al. | 29/895.3 |
| 5,542,900 | 8/1996 | Burke | 29/895.32 |

FOREIGN PATENT DOCUMENTS

| 0320533 | 12/1987 | European Pat. Off. |
| 691783 | 6/1994 | Japan |

*Primary Examiner*—Irene Cuda
*Attorney, Agent, or Firm*—Robert Spector

[57] ABSTRACT

This invention provides a highly efficient method for fabricating toner fixing rolls comprising a cured silicone rubber layer covering a metal core and a fluororesin film covering the silicone rubber layer. The characterizing feature of the present method is coating the inner surface of the fluororesin film with an organohydrogenpolysiloxane prior to contacting the film with the curable silicone rubber composition. The resultant roll is robust, highly toner-releasing; and low in hardness, and the fluororesin film and cured silicone rubber are firmly bonded to one another.

3 Claims, 1 Drawing Sheet

METHOD FOR FABRICATING ELASTOMER COATED FIXING ROLLS

BACKGROUND OF THE INVENTION

1. Field of the Invention

This invention relates to a method for fabricating toner fixing rolls that are used in copiers, facsimile machines, printers, and similar devices for preparing printed documents. More particularly, this invention relates to a method for fabricating the toner-fixing rolls used in these devices.

2. Background Information

Due to their excellent characteristics in such areas as heat resistance and compression set, silicone rubbers are widely used as covering materials for toner fixing rolls in copiers, facsimile machines, printers, and other document producing devices.

To obtain higher levels of fixing roll performance, fixing rolls have recently entered into use in which the surface of the silicone rubber layer covering the metal roll core is itself coated with a layer of fluororesin. The fluororesin layer provides additional improvements in the ability of the roll surface to resist adhesion of the toner or developer, a property which is known as toner releasability.

Low-hardness silicone rubbers having reduced inorganic filler loadings are known for use as the silicone rubber comprising the inner layer of such fluororesin-coated rolls.

Toner fixing rolls of this type have typically been fabricated by applying a film of fluororesin to the surface of the silicone rubber-coated roll followed by baking. Another fabrication method has involved bonding a fluororesin film to the surface of the silicone rubber-coated roll using an adhesive. Due either to an inability to provide a uniform coating of the fluororesin layer on the surface of the silicone rubber layer or an inability to generate adequate adhesion between silicone rubber layer and the fluororesin film, these prior art methods have been unable to provide fixing rolls that are both highly toner-releasing and highly durable.

The prior art methods also suffer from other problems, among which are a complicated production cycle and correspondingly low production efficiency.

The present invention was developed as a result of extensive investigations by the inventor directed at solving the problems described hereinabove.

One objective of the present invention is to provide a highly efficient method for fabricating very robust toner fixing rolls exhibiting a high level of toner releasability in which an fluororesin film layer is tightly bonded to an inner layer of silicone rubber layer.

SUMMARY OF THE INVENTION

The objectives of the present invention are achieved by applying a fluororesin film to the inner surface of the hollow cylindrical mold used to prepare a toner fixing roll and coating the exposed surface of the film with an organohydrogenpolysiloxane prior to injecting a liquid curable organosiloxane elastomer composition into the mold.

DETAILED DESCRIPTION OF THE INVENTION

Figure 1:
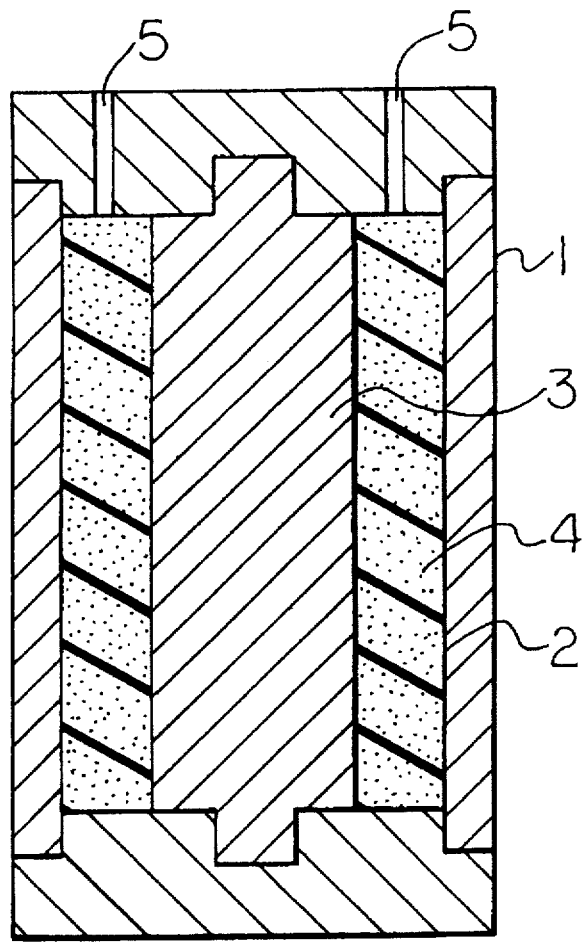
FIG. 1 is a longitudinal cross-section of a mold containing a fixing roll prepared in accordance with the present method.
Figure 2:
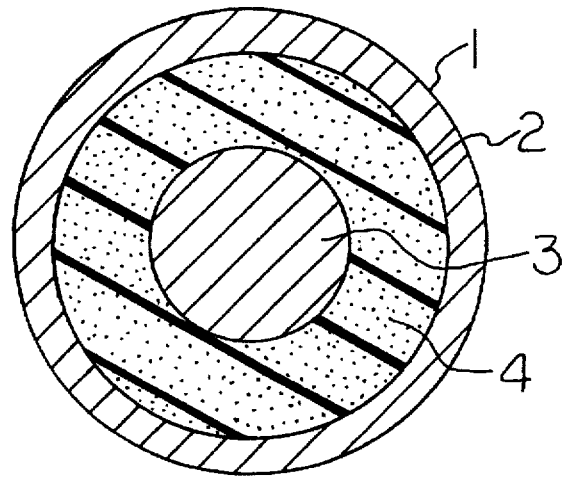
FIG. 2 is a transverse cross-section of a fixing roll prepared in accordance with the present method.

The present invention provides a method for fabricating a toner fixing roll comprising a layer of silicone rubber covering a metal core and a fluororesin film layer covering said silicone rubber layer, said method comprising 1) covering the interior wall of a hollow cylindrical mold with a cylindrical fluororesin film having an inner and an outer surface, wherein the inner surface of said cylindrical film is coated with a liquid organohydrogenpolysiloxane;
2) placing a metal roll core in the center of said mold;
3) injecting an organosiloxane composition curable to an elastomer between said film and said roll core; and
4) heating said composition sufficiently to cure it.

The fabrication method of the present invention will now be explained in greater detail with reference to the accompanying drawings.

In accordance with the present fabrication method, a cylindrical film of a fluororesin 2 is placed along the inner surface of the wall of a hollow cylindrical mold 1. The exposed surface of the film is coated with a liquid organohydrogenpolysiloxane. A metal roll core 3 is then placed in the center of the cylindrical mold 1.

The coating of organohydrogenpolysiloxane can be applied to the fluororesin film before or after the film is placed along the inner wall of the cylindrical mold.

Fluororesins that can be used to form the cylindrical resin film include but are not limited to tetrafluoroethylene-perfluoroalkoxyethylene copolymers (PFA resin), tetrafluoroethylene resin (PTFE), and fluororubbers. The fluororesin film 2 will generally have a thickness of from 30 to 70 micrometers. The inner surface of the cylindrical fluororesin film 2 is coated with an organohydrogenpolysiloxane.

Through its contact with the liquid silicone rubber composition during curing as part of the molding cycle, the organohydrogenpolysiloxane coating on the fluororesin film induces the formation of a harder material in the upper portion of the silicone rubber layer, thereby improving retention of the initial roll shape. The terms "rubber" and "elastomer" will be used interchangeably in this specification.

The coating of organohydrogenpolysiloxane on the fluororesin film also induces a tight bonding between the fluororesin film and the cured silicone rubber. This organohydrogenpolysiloxane should as a general rule contain at least 2 silicon-bonded hydrogen atoms in each molecule, however the presence of at least 3 silicon-bonded hydrogens in each molecule is preferred.

The molecular structure of this organohydrogenpolysiloxane used to coat the fluororesin film is not crucial, and straight-chain, branch-containing straight-chain, and cyclic structures may be used. When it is desired to produce a relatively harder and tougher elastomer adjacent to the fluororesin, the use of a branched organohydrogenpolysiloxane is preferred, for example, copolymers composed of the $(CH_3)_2HSiO_{1/2}$ and $SiO_{4/2}$ units and copolymers composed of the $(CH_3)_3SiO_{1/2}$, $(CH_3)_2HSiO_{1/2}$, and $SiO_{4/2}$ units.

Specific organohydrogenpolysiloxanes preferred for use in coating the exposed surface of the fluororesin film include but are not limited to trimethylsiloxy-endblocked methylhydrogenpoly-siloxanes; trimethylsiloxy-endblocked dimethylsiloxane/methylhydrogensiloxane copolymers; dimethylhydrogensiloxy-endblocked dimethylsiloxane/methylhydrogensiloxane copolymers; dimethylsiloxane/methylhydrogensiloxane cyclic copolymers; copolymers composed of the $(CH_3)_2HSiO_{1/2}$ and $SiO_{4/2}$ units; and copolymers composed of the $(CH_3)_3SiO_{1/2}$, $(CH_3)_2HSiO_{1/2}$, and $SiO_{4/2}$ units.

Methods for applying the organohydrogenpolysiloxane to the surface of the fluororesin film include but are not limited to spraying, application by brush, and application by sponge. The organohydrogenpolysiloxane can also be applied after dilution with an organic solvent.

The quantity of organohydrogenpolysiloxane applied to the fluororesin film should be sufficient to form a continuous film on the surface of the film that is exposed after the film has been applied to the inner wall of the mold. This quantity is typically from 0.01 to 2 g per m$^2$ of fluororesin film area.

The next step of the present method is the pressurized injection of a curable silicone rubber composition through inlet port 5 into the space between the cylindrical fluororesin film 2 and the metal roll core 3.

The silicone rubber composition is subsequently cured by heating the mold at a specified temperature for a time period sufficient to cure the composition. The mold is then cooled and the product is de-molded to yield a toner fixing roll comprising a silicone rubber layer covering the metal roll core 3 and a fluororesin film layer covering the cured silicone rubber layer.

The curing temperature for the silicone rubber will typically range from 50° C. to 220° C., preferably from 50° C. to 170° C.

Curable organosiloxane compositions suitable for use in accordance with the present method are liquids or pastes at ambient temperature. The required ingredients of these compositions include a liquid organopolysiloxane containing groups that react during curing of the composition, a crosslinking agent that reacts with the groups present on the organopolysiloxane during curing and a curing catalyst. These compositions cure into rubbery elastic materials when held at ambient or elevated temperature. Either a sagging or non-sagging type of curable silicone rubber composition can be used.

Among curable silicone rubber compositions, liquid compositions comprising the following ingredients are particularly preferred for use in accordance with the present method:

(A) 100 weight parts of at least one diorganopolysiloxane containing at least 2 lower alkenyl radicals in each molecule, (B) an organohydrogenpolysiloxane containing at least 2 silicon-bonded hydrogen atoms in each molecule, in a quantity sufficient to provide a value from 0.1:1 to 1:1 for the molar ratio between the total amount of silicon-bonded hydrogen atoms in this ingredient and the total moles of lower alkenyl radicals in ingredient (A), (C) 0 to 50 weight parts inorganic filler, and (D) a platinum-containing curing catalyst in an amount sufficient to provide from 0.1 to 1,000 weight parts of platinum metal for each 1,000,000 weight parts of the total of ingredients A and B.

To explain the ingredients of the curable composition in greater detail, the diorganopolysiloxane referred to as ingredient A must contain at least 2 silicon-bonded alkenyl radicals in each molecule. Suitable alkenyl radicals contain from two to about five carbon atoms and include but are not limited to vinyl, allyl, and propenyl. These radicals are referred to in this specification as "lower alkenyl".

The remaining silicon-bonded hydrocarbon radicals present in ingredient A do not contain ethylenic unsaturation and include but are not limited to alkyl such as methyl, ethyl, and propyl; aryl such as phenyl and tolyl; and substituted alkyl such as 3,3,3-trifluoropropyl and 3-chloropropyl.

Specific examples of ingredient A include but are not limited to dimethylvinylsiloxy-endblocked dimethylpolysiloxanes, dimethylvinylsiloxy-endblocked dimethylsiloxane-methylphenylsiloxane copolymers, dimethylvinylsiloxy-endblocked dimethylsiloxane/diphenylsiloxane/methylvinylsiloxane copolymers, trimethylsiloxy-endblocked dimethylsiloxane-methylvinylsiloxane copolymers, trimethylsiloxy-endblocked dimethylsiloxane-methylphenylsiloxane-methylvinylsiloxane copolymers, dimethylvinylsiloxy-endblocked methyl(3,3,3-trifluoropropyl)polysiloxanes, and dimethylvinylsiloxy-endblocked dimethylsiloxane-methyl (3,3,3-trifluoropropyl)siloxane copolymers.

Ingredient A should have a straight-chain molecular structure, although straight-chain diorganopolysiloxane containing small amounts of branching may be used. The viscosity of ingredient A at 25° C. can range from 100 to 50,000 centipoise (0.001 to 50 Pa.s).

Ingredient B, which functions as a crosslinking agent for the preferred type of curable silicone rubber composition, must contain at least 2 silicon-bonded hydrogen atoms in each molecule. The organic groups present in this ingredient are hydrocarbon radicals free of ethylenic unsaturation that include but are not limited to alkyl such as methyl, ethyl, and propyl; aryl such as phenyl and tolyl; and substituted alkyl such as 3,3,3-trifluoropropyl and 3-chloropropyl. The molecular structure of this component can be straight chain, cyclic, or network.

ingredient B is specifically exemplified by trimethylsiloxy-endblocked methylhydrogenpolysiloxanes; trimethylsiloxy-endblocked dimethylsiloxane-methylhydrogensiloxane copolymers; dimethylhydrogensiloxy-endblocked dimethylsiloxane-methylhydrogensiloxane copolymers; dimethylsiloxane-methylhydrogensiloxane cyclic copolymers; copolymers composed of $(CH_3)_2HSiO_{1/2}$ and $SiO_{4/2}$ units; and copolymers composed of $(CH_3)_3SiO_{1/2}$, $(CH_3)_2HSiO_{1/2}$, and $SiO_{4/2}$ units.

The viscosity of ingredient B is not critical, however viscosities at 25° C. ranging from 3 to 10,000 centipoise (0.003 to 10 Pa.s) are preferred. Ingredient B should be added in a quantity that yields a value of 0.1:1 to 1:1 for the ratio between the number of moles of silicon-bonded hydrogen in this ingredient and the number of moles of silicon-bonded alkenyl radicals in ingredient A.

The inorganic filler, referred to hereinafter as ingredient C is an optional ingredient and comprises those inorganic fillers heretofore generally known for use in silicone rubbers. The filler is not particularly restricted as to type or other qualities. Suitable fillers include but are not limited to fumed silica, precipitated silica, fumed and precipitated silicas that have been treated with an organosilane or organosiloxane, fused silica powder, quartz powder, diatomaceous earth, carbon black, calcium carbonate powder, alumina powder, iron oxide powder, titanium oxide powder, zinc oxide powder and magnesium oxide powder. The concentration of this ingredient can range from 0 to 150 weight parts per 100 parts of ingredient A.

The platinum-containing catalyst, referred to hereinafter as ingredient D, is a platinum-containing catalyst that promotes curing of the curable silicone rubber compositions used in accordance with the present method. Suitable catalysts include but are not limited to platinum micropowder, chloroplatinic acid, chloroplatinic acid-olefin complexes, alcohol solutions of chloroplatinic acid, and chloroplatinic acid-alkenylsiloxane complexes.

Another type of suitable catalyst is micropowder made of thermoplastic resin containing one of the aforementioned platinum catalysts.

The concentration of ingredient D should be equivalent to from 0.1 to 1,000 weight parts of platinum metal for each 1 million weight parts of ingredient A, preferably from 1 to 100 weight parts of platinum metal for each one million weight parts of ingredient A. An acceptable cure is not obtained at less than 0.1 weight part of platinum, while additions in excess of 100 weight parts per one million weight parts of ingredient A are uneconomical.

While the curable silicone rubber compositions used in accordance with the present method contain ingredients A to D as described above, they may also contain the various additives heretofore known for use in this type of composition, insofar as the objectives of the present invention are not impaired. Suitable optional additives include but are not limited to heat stabilizers, flame retardants, and internal mold-release agents.

The present curable compositions are prepared by mixing ingredients A to D, along with any optional ingredients, to homogeneity. The resulting curable composition preferably has a viscosity at 25° C. ranging from 10,000 to 200,000 centipoise (10 to 200 Pa.s).

The properties of a silicone rubber may not be apparent when this viscosity falls below 10,000 centipoise (10 Pa.s). On the other hand, when this viscosity exceeds 200,000 centipoise (200 Pa.s), injection of the charge into the mold during the present method becomes quite difficult, requiring long injection times and/or high pressures.

In toner fixing rolls produced by the fabrication method according to the present invention, the outer zone of cured silicone rubber, i.e. the rubber in the area wherein the layer of cured silicone rubber and fluororesin film are in contact, has a higher crosslink density and greater hardness than the remaining portion of the rubber layer. Moreover, this outer zone of rubber provides strong adhesion between the fluororesin film and silicone rubber layer. The hardness of the outer zone of cured rubber can be any value which does not compromise achieving a low hardness for the entire rubber layer.

The thickness of the outer zone of cured silicone rubber will vary depending on the temperature conditions under which the liquid silicone rubber composition is cured, but as a general rule will not exceed 1,000 microns. In contrast, the remaining portion of the cured silicone rubber, referred to as the low-hardness inner zone, is composed of cured silicone having a lower crosslink density and lower hardness than the rubber in the outer zone. The hardness of the cured rubber in the inner zone preferably does not exceed 20 on the JIS A hardness scale, and the hardness measured at the surface of the fixing roll preferably does not exceed 35 as the JIS A hardness.

EXAMPLES

The invention will be explained in greater detail by means of working examples, which should not be interpreted as limiting the scope of the present invention as defined in the accompanying claims. Unless otherwise indicated in the examples all parts and percentages are by weight and the reported viscosity values were measured at 25° C.

The various properties of the liquid silicone rubber compositions referred to in the examples were evaluated by the following methods.

Hardness of the fixing roll surface

The type A spring-type hardness tester described in Japanese Industrial Standard (JIS) K 6301 was applied to the surface of the fixing roll and the hardness scale reading was recorded.

Roll Moldability

The appearance of the molded fixing roll was visually inspected. A rating of "excellent" was recorded only when the toner fixing roll was a completely satisfactory product.

Adhesion

After molding of the fixing roll had been completed, the metal roll core was immobilized and the fluororesin film layer was manually peeled off. The proportion of cohesive failure at the failure surface was measured.

Example 1

The following ingredients were combined and mixed to homogeneity to give a liquid curable silicone rubber composition with a viscosity of 500,000 centipoise (500 Pa.s): 100 parts of a dimethylvinylsiloxy-endblocked dimethylpolysiloxane with a viscosity of 15,000 centipoise (15 Pa.s) and a vinyl content of 0.23 weight %, 15 parts of fumed silica with a specific surface area of 200 m$^2$/g, 0.5 part of a trimethylsiloxy-endblocked dimethylsiloxane-methylhydrogensiloxane copolymer with a silicon-bonded hydrogen content of 0.9 weight %, 0.5 part of 1-ethynyl-1-cyclohexanol as a cure inhibitor, and 0.6 part chloroplatinic acid-1,3-divinyltetramethyldisiloxane complex catalyst as the curing catalyst. The catalyst contained 0.6 weight percent of platinum metal.

Next, a cylindrical film of a sodium naphthalene-treated tetrafluoroethylene resin exhibiting a thickness of 50 micrometers was coated on its inner surface with a trimethylsiloxy-endblocked methylhydrogenpolysiloxane having a silicon-bonded hydrogen content of 0.16 weight percent to achieve a concentration of organohydrogensiloxane of 0.2 g/m$^2$ on the surface of the film.

The resultant cylindrical film 2 was placed over the interior surface of the wall of a hollow cylindrical mold 1 having a length of 400 mm and an inside diameter of 20 mm. The outer diameter of the film cylinder was about 20 mm.

An iron roll core 3 with a diameter of 10 mm was then placed in the center of the mold, and the liquid silicone rubber composition described in the preceding section of this example was then injected under a pressure of 2 kg/cm$^2$ through injection port 5.

The silicone rubber composition was cured by maintaining the mold and its contents at 150° C. for 10 minutes, and the resultant fixing roll was de-molded after cooling. The properties of the resultant fluororesin-covered silicone rubber roll were determined, and the results are reported in Table 1.

Example 2

A fixing roll was fabricated as described in Example 1, with the exception that the inner surface of the cylindrical fluororesin film was coated with a methylhydrogensiloxane resin having a silicon-bonded hydrogen content of 1.2 weight percent and containing Me$_2$HSiO$_{1/2}$ and SiO$_2$ units at a concentration of 0.2 g/m$^2$, in place of the trimethylsiloxy-endblocked methylhydrogenpolysiloxane described in Example 1.

The properties of this fixing roll were determined as described in a preceding section of this specification, and these results are reported in Table 1.

Comparative Example 1

A toner fixing roll outside the scope of the present invention was fabricated as described in Example 1, with the exception that the inner surface of the cylindrical fluororesin film was not coated with an organohydrogenpolysiloxane. The properties of this fixing roll were measured in the same manner as the roll described in Example 1, and the results are reported in Table 1.

TABLE 1

|  | Example 1 | Example 2 | Comparative Example 1 |
|---|---|---|---|
| Roll Moldability | excellent | excellent | excellent |
| Adhesion to the Fluororesin Film | excellent | excellent | poor |
| % Cohesive failure | 100% | 100% | 47% |
| roll surface hardness (JIS A) | 15° | 15° | 13° |

That which is claimed is:

1. A method for fabricating fixing rolls comprising a silicone rubber layer covering a metal core and a layer of a fluororesin film covering said silicone rubber layer, said method comprising
   1) covering the interior wall of a hollow cylindrical mold with a cylindrical fluororesin film having an inner and an outer surface, wherein the inner surface of said cylindrical film is coated with a liquid organohydrogenpolysiloxane;
   2) placing a metal roll core in the center of said mold;
   3) injecting an organosiloxane composition curable to an elastomer between said film and said roll core; and
   4) heating said composition sufficiently to cure it.

2. A method according to claim 1, wherein the liquid silicone rubber composition comprises
   (A) 100 weight parts of a diorganopolysiloxane with a viscosity at 25° C. of 100 to 50,000 centipoise (0.1 to 50 Pa.s) that contains at least 2 silicon-bonded lower alkenyl radicals in each molecule,
   (B) an organohydrogenpolysiloxane containing at least 2 silicon-bonded hydrogen atoms in each molecule, in an amount equivalent to a value of from 0.1:1 to 1:1 for the ratio between the number of moles of silicon-bonded hydrogen atoms and the number of moles of silicon-bonded alkenyl in ingredient (A),
   (C) 0 to 150 weight parts of an inorganic filler, and
   (D) an amount of a platinum-containing catalyst equivalent to from 0.1 to 1,000 weight parts of platinum metal for each million weight parts of ingredient A.

3. A method according to claim 1 wherein said lower alkenyl radicals are selected from the group consisting of vinyl, allyl and propenyl, and the surface of the fixing roll has a JISA hardness value of no more than 35.

* * * * *